US008289837B2

(12) United States Patent
Kim et al.

(10) Patent No.: US 8,289,837 B2
(45) Date of Patent: Oct. 16, 2012

(54) METHODS AND APPARATUSES FOR MULTIMODE BLUETOOTH AND WLAN OPERATION CONCURRENTLY

(75) Inventors: Beomsup Kim, Cupertino, CA (US); Charles J. Persico, Ranch Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/114,676

(22) Filed: May 2, 2008

(65) Prior Publication Data

US 2008/0273552 A1      Nov. 6, 2008

Related U.S. Application Data

(60) Provisional application No. 60/915,977, filed on May 4, 2007.

(51) Int. Cl.
*H04J 11/00* (2006.01)
(52) U.S. Cl. ........ 370/210; 370/208; 370/281; 370/295; 370/319; 370/339; 370/344; 370/436; 370/480; 455/60; 455/206; 455/216; 455/454; 455/552.1; 375/132; 375/260
(58) Field of Classification Search ................... 370/208, 370/210, 281, 295, 319, 327–339, 343, 344, 370/350, 341, 436, 480, 503, 527, 529; 455/59, 455/60, 206, 216, 339, 450, 451, 452.1, 454, 455/552.1, 553.1, 188.1, 103, 105, 179.1; 375/132–137, 260
See application file for complete search history.

(56) References Cited

U.S. PATENT DOCUMENTS 6,928,046 B1 *   8/2005   Sajadieh et al. .............. 370/203
(Continued)

FOREIGN PATENT DOCUMENTS

JP          2003218819  A         7/2003
(Continued)

OTHER PUBLICATIONS

Vogeler et al., Suppression of Bluetooth Interference on OFDM in the 2.4 GHz ISM Band, Sep. 2003, 8th International OFDM-Workshop (InOWo 03).*

(Continued)

*Primary Examiner* — Hoon J Chung
(74) *Attorney, Agent, or Firm* — Kevin T. Cheatham

(57) ABSTRACT

A wideband telecommunications device with narrow band support. The device may be a receiver having a wireless interface configured to receive combined first and second signals, the first signal having data in a first frequency band and the second signal having data in a second frequency band wider than the first frequency band, wherein the first frequency band is within the second frequency band. The receiver may also be a processing system configured to recover the data in the first signal from the combined first and second signals. The device may be a transmitter having a first signal source configured to provide a first signal having data in a first frequency band; a second signal source having a second frequency band, the first frequency band being within a sub-band of the second frequency band, wherein the second signal source is configured to provide a second signal having data in the second frequency band with no data in the sub-band of the second frequency band, a processing system configured to combine the first and second signals, and a wireless interface configured to transmit the combined first and second signal.

22 Claims, 6 Drawing Sheets

U.S. PATENT DOCUMENTS

| | | | | |
|---|---|---|---|---|
| 7,233,777 B2* | 6/2007 | Colling | | 455/108 |
| 2003/0219034 A1 | 11/2003 | Lotter et al. | | |
| 2004/0131025 A1* | 7/2004 | Dohler et al. | | 370/328 |
| 2005/0152317 A1* | 7/2005 | Awater et al. | | 370/338 |
| 2005/0266808 A1* | 12/2005 | Reunamaki et al. | | 455/101 |
| 2006/0015674 A1* | 1/2006 | Murotake | | 711/101 |
| 2007/0053414 A1* | 3/2007 | Payne et al. | | 375/141 |
| 2009/0034438 A1* | 2/2009 | Soulie et al. | | 370/280 |
| 2010/0142364 A1* | 6/2010 | Sahlman | | 370/210 |

FOREIGN PATENT DOCUMENTS

| | | |
|---|---|---|
| WO | WO2008004155 A2 | 1/2008 |
| WO | WO 2008/137866 A2 * | 11/2008 |

OTHER PUBLICATIONS

Schiphorst et al., A Bluetooth-enabled HiperLAN/2 receiver, Oct. 6-9, 2003, Proceedings of the IEEE 58th Vehicular Technology Conference 2003-Fall, Oct. 6-9, 2003, Orlando, USA, pp. 3443-3447.*

Chari S K: "Adaptive subcarrier selection for mitigating Bluetooth interference in OFDM based wireless LANs operating at 2.4 GHz" Proceedings of the SPIE—The International Society for Optical Engineering, SPIE, Bellingham, VA: US, vol. 5100, Jan. 1, 2003, pp. 10-18, XP002277260 figure 2 Section 7. OFDM Transmitter and receiver.

Dan Zhang et al "A novel narrowband interference canceller for OFDM systems" Wireless Communications and Networking Conference, 2004. WCNC. 2004 IEEE Atlanta, GA, USA Mar. 21-25, 2004, Piscataway, NJ, USA,IEEE, vol. 3, Mar. 21, 2004, pp. 1426-1430, XP010707968 ISBN: 978-0-7803-8344-9 figure 2 Sections I. and II.

International Search Report and Written Opinion—PCT/US2008/062688, International Search Authority—European Patent Office—Dec. 12, 2008.

Leblanc J P et al: "A rank-reduced LMMSE canceller for narrowband interference suppression in OFDM-based systems" IEEE Transactions on Communications, IEEE Service Center, Iscataway, NJ, US, vol. 51, No. 12, Dec. 1, 2003, pp. 2126-2140, XP011105072 ISSN: 0090-6778 Sections I. II, and III.

Wen-Sheng Hou et al "Adaptive Narrowband Interference Rejection in DS-CDMA Systems: A Scheme of Parallel Interference Cancellers" IEEE Journal on Selected Areas in Communications, IEEE Service Center Piscataway, US, vol. 19, No. 6, Jun. 1, 2001, XP011055388 ISSN: 0733-8716 figure 2 Sections I., II. and III.

Kai Yang, et al., "Software-defined decision-feedback multiuser detection in frequency domain for single-carrier and multi-carrier CDMA systems-a sequential quadratic programming approach", The 14th IEEE 2003 International Symposium on Personal, Indoor and Mobile Radio Communication Proceedings, 2003, pp. 1255-1259.

Taiwan Search Report—TW097116559—TIPO—Jan. 12, 2012.

* cited by examiner

METHODS AND APPARATUSES FOR MULTIMODE BLUETOOTH AND WLAN OPERATION CONCURRENTLY

CLAIM OF PRIORITY UNDER 35 U.S.C. §119

The present Application for Patent claims priority to Provisional Application No. 60/915,977 entitled "Wideband OFDM Transceiver with Concurrent Narrow-Band Transceiver Support," filed May 4, 2007", and assigned to the assignee hereof and hereby expressly incorporated by reference herein.

BACKGROUND

1. Field

The present disclosure relates generally to telecommunications, and more particularly, to a wideband telecommunication device with narrow band support.

2. Background

The deployment of wireless communication systems has been growing at an astounding rate. Today, cellular telephones have become commonplace among consumers and are beginning to outnumber traditional land-line phones in many countries. In addition, wireless local area networks (WLAN) are increasingly being used to supplement or replace wired networks in many homes, offices, airports, hotels, coffee shops, and other places.

The commercial development of WLANs began some time ago when the Federal Communications Commission (FCC) authorized the public use of the Industrial, Scientific, and Medical (ISM) frequency band for WLAN devices. This led to the proliferation of a number wireless communication standards within the ISM band, including by way of example, IEEE 802.11 and Bluetooth.

As these wireless communication standards continue to be developed and implemented into existing and new WLANs, there exists an increasing need for techniques to avoid interference between them. Some attempts have been proposed in the past to reduce interference by controlling the timing of wireless devices to avoid signal mixing. However, this time multiplexing scheme tends to reduce throughput and limits compatibility with wireless devices. Other methods, such as interference cancellation, have been tried, but are rarely used in practice.

Accordingly, there is a need in the art for improved methods of operating wireless devices in a shared frequency band, such as, by way of example, within the ISM band.

SUMMARY

In an aspect of the disclosure, a receiver includes a wireless interface configured to receive combined first and second signals, the first signal having data in a first frequency band and the second signal having data in a second frequency band wider than or equal to the first frequency band, wherein at least a portion of the first frequency band is within the second frequency band for a period of time, and a processing system configured to recover from the combined first and second signals the data in at least one of the first and second signals during the period of time.

In another aspect of the disclosure, a transmitter includes a first signal source configured to provide a first signal having data in a first frequency band, a second signal source having a second frequency band, wherein at least a portion of the first frequency band is within a sub-band of the second frequency band for a period of time, the second signal source being configured to provide a second signal having data in the second frequency band with no data in the sub-band of the second frequency band, a processing system configured to combine the first and second signals, and a wireless interface configured to transmit the combined first and second signal.

In yet another aspect of the disclosure, a receiver includes means for receiving combined first and second signals, the first signal having data in a first frequency band and the second signal having data in a second frequency band wider than or equal to the first frequency band, wherein at least a portion of the first frequency band is within the second frequency band for a period of time, and means for recovering from the combined first and second signals the data in at least one of the first and second signals during the period of time.

In a further aspect of the disclosure, a transmitter includes means for providing a first signal having data in a first frequency band, means for providing a second signal having a second frequency band, wherein at least a portion of the first frequency band is within a sub-band of the second frequency band for a period of time, the means for providing the second signal being configured to the second signal with in the second frequency band with no data in the sub-band of the second frequency band, means for combining the first and second signals, and means for transmitting the combined first and second signal.

In yet a further aspect of the disclosure, a method of communications includes receiving combined first and second signals, the first signal having data in a first frequency band and the second signal having data in a second frequency band wider than or equal to the first frequency band, wherein at least a portion of the first frequency band is within the second frequency band for a period of time, and recovering from the combined first and second signals the data in at least one of the first and second signals during the period of time.

In another aspect of the disclosure, a method of communications includes means for providing a first signal having data in a first frequency band, means for providing a second signal having a second frequency band, wherein at least a portion of the first frequency band is within a sub-band of the second frequency band for a period of time, the means for providing the second signal being configured to the second signal with in the second frequency band with no data in the sub-band of the second frequency band, means for combining the first and second signals, and means for transmitting the combined first and second signal.

In yet another aspect of the disclosure, a machine-readable medium includes comprising instructions executable by a processing system in a receiver, the receiver having a wireless interface configured to receive combined first and second signals, the first signal having data in a first frequency band and the second signal having data in a second frequency band wider than or equal to the first frequency band, wherein at least a portion of the first frequency band is within the second frequency band, the instructions comprising code to recover from the combined first and second signals the data in at least one of the first and second signals during the period of time.

In a further aspect of the disclosure, a machine-readable medium comprising instructions executable by a processing system in a transmitter, the instructions comprising code to provide a first signal having data in a first frequency band, provide a second signal having a second frequency band, wherein at least a portion of the first frequency band is within a sub-band of the second frequency band for a period of time, the second signal source being configured to provide a second signal having data in the second frequency band with no data in the sub-band of the second frequency band, and combine the first and second signals for transmission.

DETAILED DESCRIPTION

The detailed description set forth below in connection with the appended drawings is intended as a description of various configurations of the present invention and is not intended to represent the only configurations in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
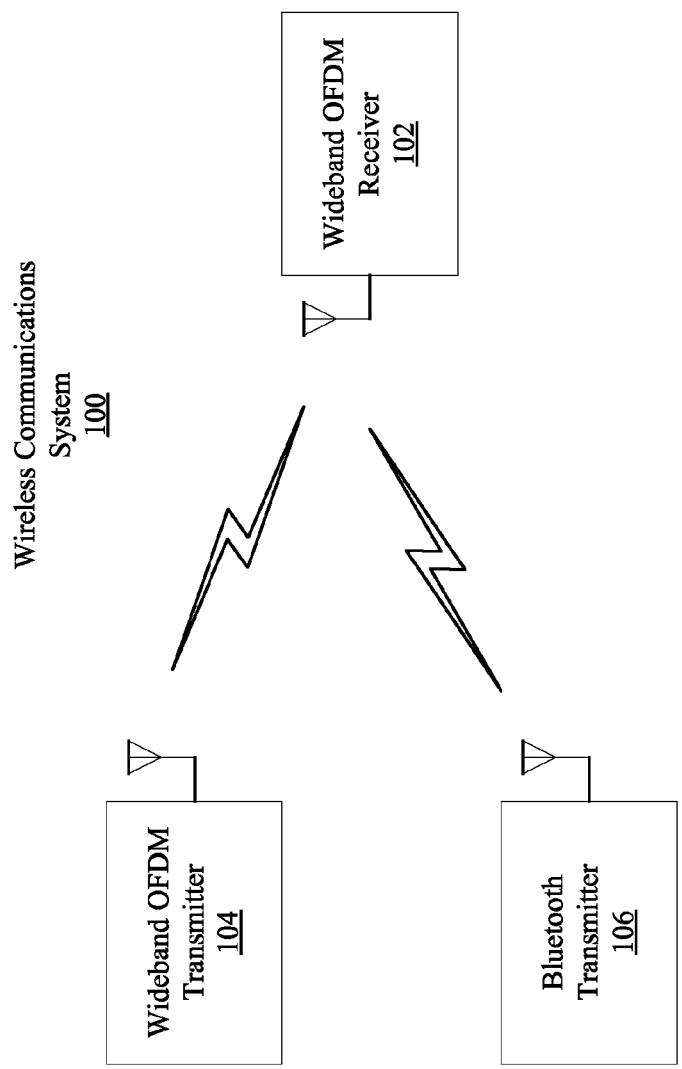
FIG. 1 is a conceptual diagram illustrating an example of a receiver in a telecommunications system.

FIG. 1 is a conceptual diagram illustrating an example of a receiver 102 in a telecommunications system 100. The receiver 102 may be part of a user device, such as a mobile telephone, a personal digital assistant (PDA), a personal or laptop computer, a modem, a camera, a game console, a digital audio player, or any other suitable video, audio, and/or data device. Alternatively, the receiver 102 may be part of an access point that provides backhaul services to one or more user devices in the telecommunications system 100. In many applications, the receiver 102 may be part of a device that transmits as well as receives. Such a device would therefore require a transmitter, which may be a separate component or integrated with the receiver into a single component known as a "transceiver." As those skilled in the art will readily appreciate, the various concepts described throughout this disclosure are applicable to any suitable receiver function, regardless of whether the receiver is a stand-alone device, integrated into a transceiver, or part of a user device.

In one example, the receiver 102 may be an OFDM receiver. OFDM stands for "orthogonal frequency division multiplexing," which is a multi-carrier modulation technique that effectively partitions the overall system bandwidth into a large number of sub-carriers or tones. These tones are spaced apart at precise frequencies to provide orthogonality. Data may be modulated onto the tones by adjusting each tone's phase, amplitude or both. Any suitable conventional modulation scheme may be used, such as phase shift keying (QPSK) or quadrature amplitude modulation (QAM), but other modulation schemes may also be used. Today, a number of OFDM based wireless standards exist, including by way of example, IEEE 802.11n. An IEEE 802.11n compliant device operates in a 2.4 GHz ISM band (i.e., 2.400 to 2.4835 GHz).

The OFDM receiver 102 may be configured for wideband applications. In this configuration, the receiver 102 can recover data from one or more channels transmitted from an OFDM transmitter 104 across the entire 83.5 MHz. of the 2.4 GHz ISM band. In addition, the receiver 102 may also be configured to recover a signal transmitted from a Bluetooth transmitter 106 without the need for a separate Bluetooth receiver.

Figure 2:
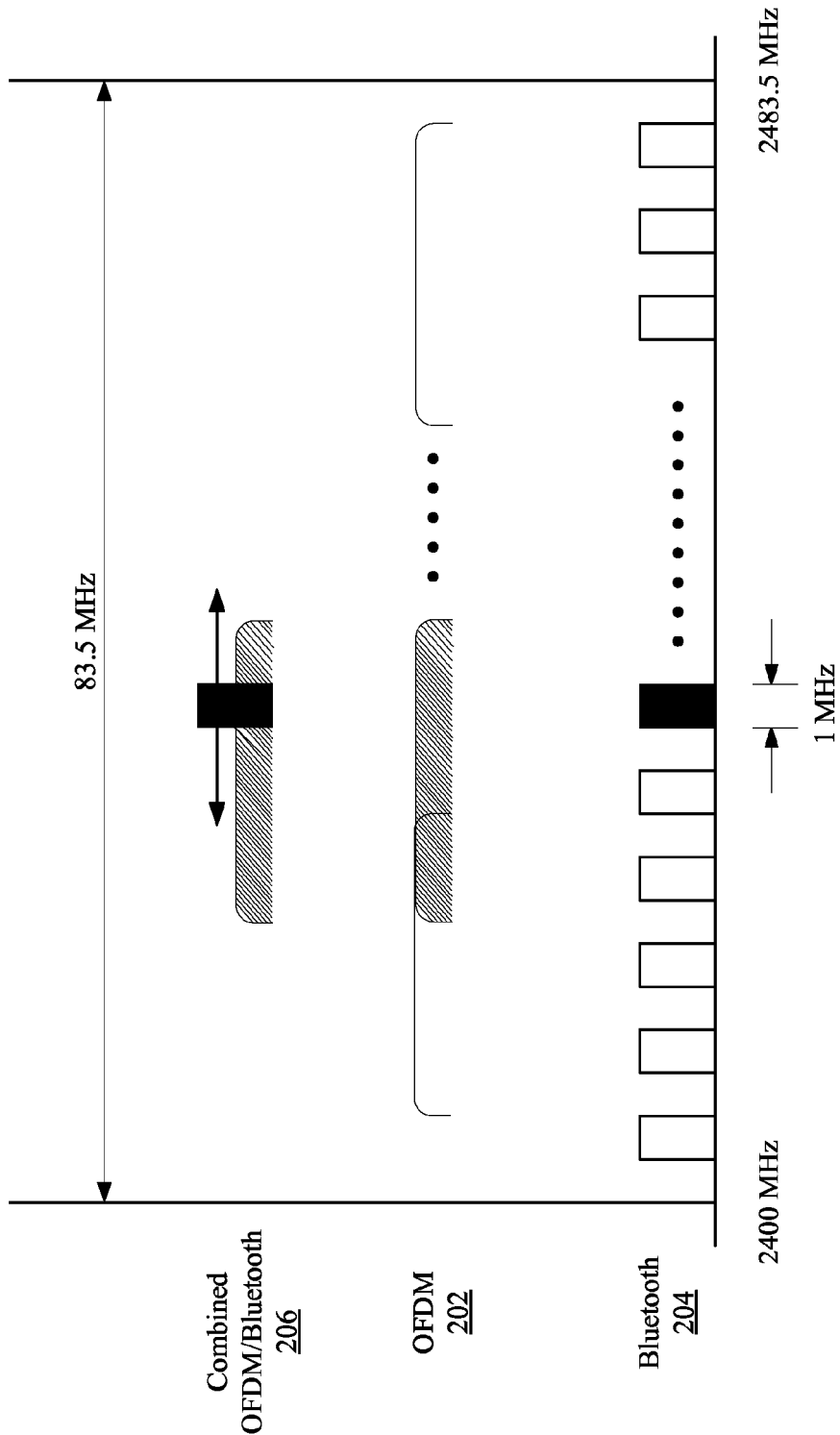
FIG. 2 is a conceptual diagram illustrating an example of a 2.4 GHz ISM band.

FIG. 2 is a conceptual diagram illustrating an example of a 2.4 GHz ISM band. In this example, an OFDM signal 202 and a Bluetooth signal 204 are transmitted at the same time by two different transmitters. As shown in FIG. 2, the received signal 206 includes both the OFDM and Bluetooth signal. In this example, the Bluetooth signal 204 is shown within the frequency band of the OFDM signal 202. However, as those skilled in the art will readily appreciate, the Bluetooth signal 204 may be moving in the frequency domain over time in and out of the frequency band for the OFDM signal 202. Specifically, the Bluetooth signal 204 may be within, outside, or overlapping with the OFDM signal 202.

Against this background, various techniques and processes will now be presented for recovering the OFDM and Bluetooth signals from the mixed RF signal 206. While these techniques and processes may be well suited for this application, those skilled in the art will readily appreciate that these techniques can be extended to transceivers, transmitters, receivers, and other suitable devices that are compliant with other wireless standards. Accordingly, any reference to a technique or process to recover an OFDM and Bluetooth signals is intended only to illustrate various inventive aspects of the present invention, with the understanding that these inventive aspects have a wide range of applications.

Figure 3:
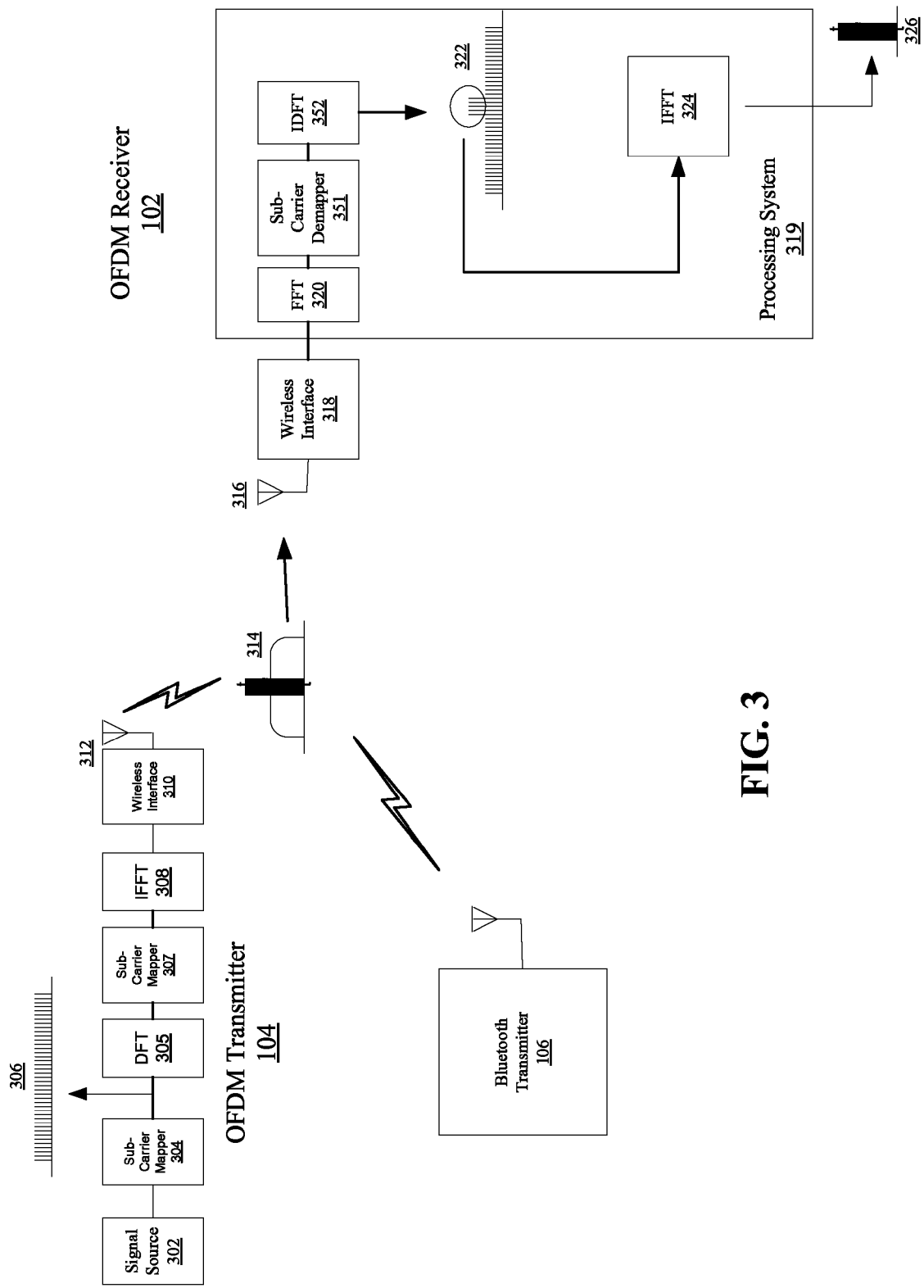
FIG. 3 is a conceptual diagram illustrating an example of a wideband OFDM receiver capable of receiving the entire 83.5 MHz of the 2.4 GHz ISM band.

FIG. 3 is a conceptual diagram illustrating an example of a wideband OFDM receiver 102 capable of receiving the entire 83.5 MHz of the 2.4 GHz ISM band. In this example, an OFDM transmitter 104 and a Bluetooth transmitter 106 are shown concurrently transmitting to the wideband OFDM receiver 102 in the same ISM band.

The OFDM transmitter 104 includes a signal source 302 that generates data. The data is modulated onto the tones of an OFDM signal 306 by a sub-carrier mapper 304. The OFDM signal 306 output from the sub-carrier mapper 304 is provided to a discrete Fourier transform (DFT) 305. The DFT 305 in combination with the sub-carrier mapper 307 tends to reduce the peak-to-average ratio of the signal at the output of the transmitter 104 by performing a DFT on the OFDM signal 304 and then re-modulating the data onto different tones of the OFDM signal. The output from the sub-carrier mapper 307 is provided to an inverse fast Fourier transform (IFFT) 308, which provides an efficient algorithm to compute the inverse of the DFT. The IFFT 308 provides a time-domain representation of the signal from the sub-carrier mapper 307. A wireless interface 310 converts the time domain signal from the IFFT 308 to an analog signal, which is used to modulate a carrier frequency for transmission through an antenna 312.

A combined RF signal comprising the signal from the OFDM transmitter 104 and the signal from the Bluetooth transmitter 106, as shown by waveform 314, where both signals occupy the same frequency band, is received by an antenna 316 and provided to a wireless interface 318. However, as discussed earlier, the signal from the Bluetooth transmitter 106 may be moving in frequency over time. The wireless interface 318 recovers the combined RF analog signal from the carrier and provides various processing (e.g., filtering, amplification, frequency down-conversion, and analog-to-digital conversion) to obtain a time-domain samples. The time-domain samples are then provided to a processing system 319.

The processing system 319 converts the time-domain samples back to the frequency domain using a fast Fourier transform (FFT) 320. A sub-carrier demapper 351 in combination with an inverse discrete Fourier transform (IDFT) 352 performs the inverse operation of the DFT 305 and sub-carrier demapper 307 in the transmitter 104 to recover the original OFDM signal 306 along with a number of tones that also include Bluetooth data, as shown by waveform 322. If the Bluetooth data in those tones is stronger than the 802.11 data in those tones, an IFFT 324 may be used to synthesize the Bluetooth signal and recover the data transmitted by the Bluetooth transmitter 106 (i.e., narrow band signal) as shown by waveform 326. In this case, the OFDM data carried by those tones will be dropped. This data can be retransmitted by the OFDM transmitter 104 if needed.

If a forward error correction (FEC) code or error correction code (ECC) is used, with or without interleaving, the dropped data can be recovered at the receiver 102 with a FEC or ECC decoder. FEC and ECC are signal processing techniques that add redundancy to the transmitted information using a predetermined algorithm. The added redundancy allows the receiver to detect and possibly correct errors in the transmitted information. With FEC or ECC, the Bluetooth and OFDM signal can be recovered even if the Bluetooth signal power is lower than that of OFDM signal power in the overlapped portion of the frequency band. This technique will now be presented with reference to FIG. 4.

Figure 4:
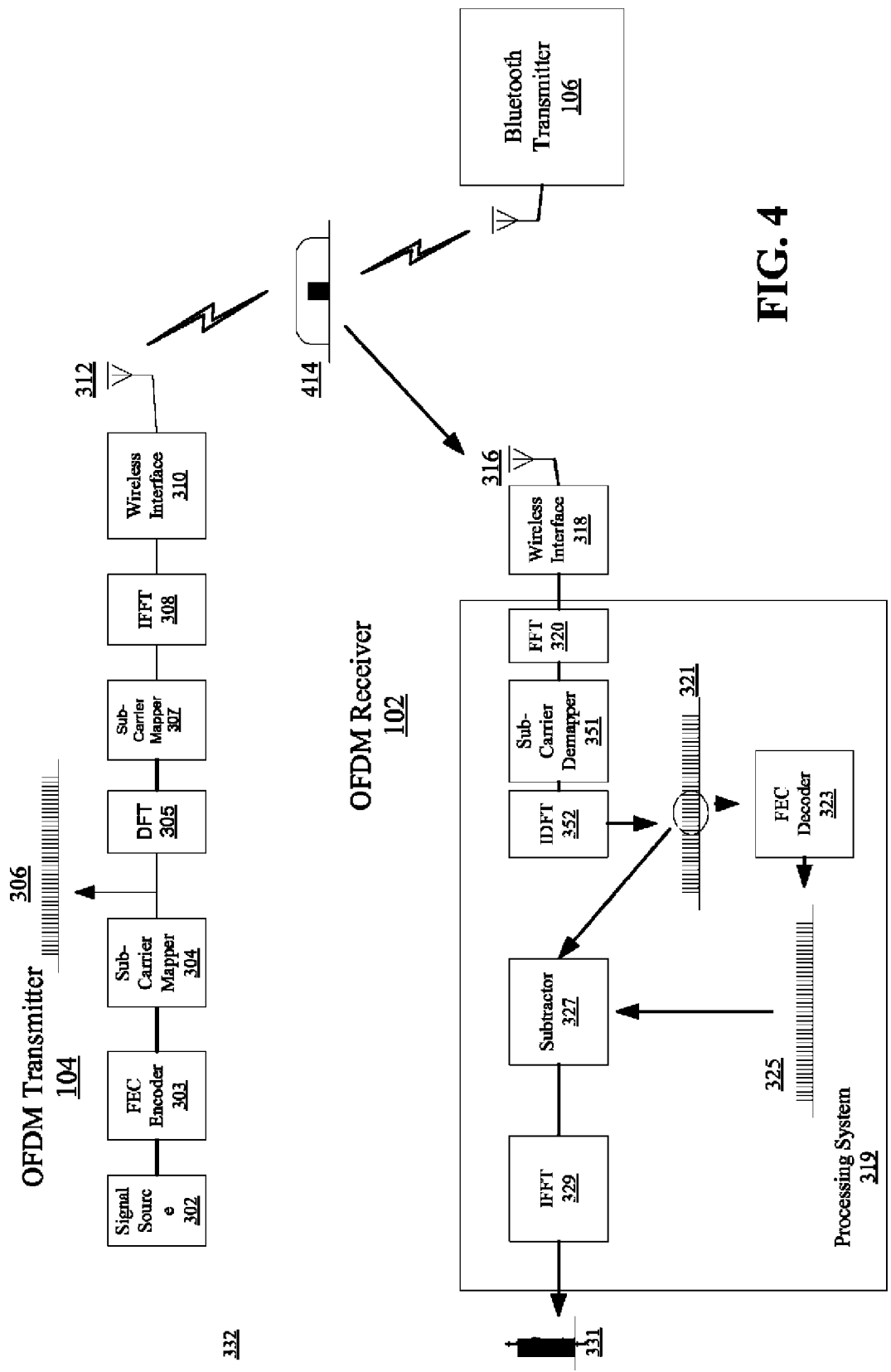
FIG. 4 is a conceptual diagram illustrating another example of a wideband OFDM receiver capable of receiving the entire 83.5 MHz of the 2.4 GHz ISM band.

FIG. 4 is a conceptual diagram illustrating another example of a wideband OFDM receiver 102 capable of receiving the entire 83.5 MHz of the 2.4 GHz ISM band. An OFDM transmitter 104 and a Bluetooth transmitter 106 are shown concurrently transmitting to the wideband OFDM receiver 102 in the same ISM band.

The OFDM transmitter 104 is similar to the OFDM transmitter described in connection with FIG. 3. The only difference between the two is the addition of a FEC encoder 303. In this example, the FEC encoder 303 is used to add redundancy to the data generated by the signal source 302 to enable the receiver 102 to detect and correct transmission errors. The encoded data is then modulated onto the tones of an OFDM signal, as shown by waveform 306, by a sub-carrier mapper 304, processed by a DFT 305 and sub-carrier mapper 307 to reduce the peak-to-average ratio of the signal at the output of the transmitter 104, converted to a time-domain signal by an IFFT 308, and provided to a wireless interface 310 for conversion to an analog signal before being modulated onto a carrier for transmission through an antenna 312.

A combined RF signal comprising the signal from the OFDM transmitter 104 and the signal from the Bluetooth transmitter 106, as shown by waveform 414, where both signals occupy the same frequency band, is received by an antenna 316 and provided to a wireless interface 318. In this example, the Bluetooth signal level is lower than that of the OFDM signal. The combined RF signal is received by an antenna 316 provided to a wireless interface 318. The wireless interface 318 recovers the combined RF analog signal from the carrier and provides various processing (e.g., filtering, amplification, frequency down-conversion, and analog-to-digital conversion) to obtain time-domain samples. The time-domain samples are then provided to a processing system 319.

The processing system 319 converts the time-domain samples back to the frequency domain using a FFT 320. A sub-carrier demapper 351 in combination with an IDFT 352 performs the inverse operation of the DFT 305 and sub-carrier demapper 307 in the transmitter 104 to recover the original OFDM signal 306, as shown by waveform 322. In this example, a portion of the OFDM data may be corrupted by the Bluetooth data, and therefore, may require a FEC decoder 323 to recover that data. The output of the FEC decoder 323, shown by waveform 325, represents the data transmitted by the OFDM transmitter 104. A subtractor 327 may be used to compute the difference between the OFDM data and the frequency-domain signal output from the IDFT 352 to recover the Bluetooth data (i.e., narrow band signal). An IFFT 329 may be used to synthesize the Bluetooth signal and recover the data transmitted by the Bluetooth transmitter 106, as shown by waveform 331. In this case, the OFDM data carried by those tones will be dropped.

Figure 5:
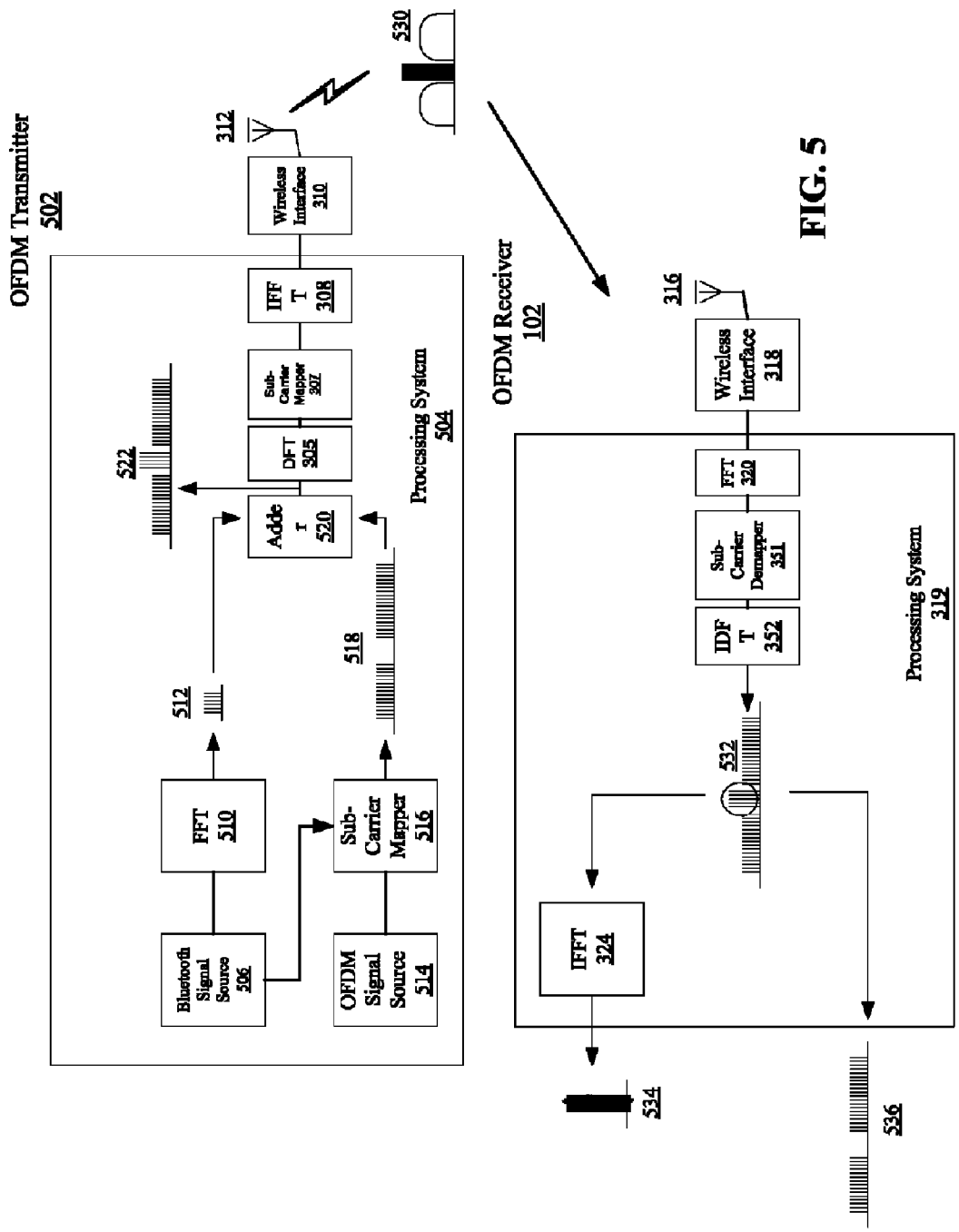
FIG. 5 is a conceptual diagram illustrating a further example of a wideband OFDM transmitter and receiver.

FIG. 5 is a conceptual diagram illustrating a further example of a wideband OFDM transmitter and receiver. In this example, the receiver 102 may be part of a user device and the transmitter 502 may be part of an access point that provides backhaul services to one or more user devices in the telecommunications system 100. Alternatively, the transmitter 502 may be part of a user device and the receiver 102 may be part of an access point. In many applications, the transmitter 502 and/or the receiver 102 may be part of a device capable of two-way communications. In such applications, the transmitter 502 and/or receiver 102 may be integrated into a transceiver. In the detailed description to follow, the telecommunications system 100 will be presented with a transmitter 502 at one end of the transmission medium and a receiver 102 at the other end. Those skilled in the art will readily recognize how to extend the concepts described herein to two-way communications.

The transmitter 502 may be used to combine a wideband OFDM signal with a narrow band Bluetooth signal. In this example, the tones within the Bluetooth band will not be used to carry OFDM data. As a result, the Bluetooth signal can be recovered with a wideband OFDM receiver 102 without interference from the OFDM signal without the need for a separate Bluetooth transmitter or receiver.

The wideband OFDM transmitter 502 includes a multi-mode Bluetooth and WLAN processing system 504. In this configuration, the processing system 504 includes a Bluetooth signal source 506, which behaves as a Bluetooth master device and determines the Bluetooth hopping frequency. The Bluetooth signal source 506 may also control the Bluetooth power level since it is the master and improve the signal quality of the transmitted and received Bluetooth signal within the ISM band. The Bluetooth signal source 506 provides data to a FFT 510 in the processing system 504 in the form of a time-domain signal. The FFT 510 converts the time-domain signal into the frequency domain as shown by waveform 512.

The processing system 504 also includes an OFDM signal source 514. The OFDM signal source 514 is used to generate data. The data is modulated onto the tones of an OFDM signal by a sub-carrier mapper 516 in the processing system 516 as shown by waveform 518. In this example, the Bluetooth signal source 506 provides signaling to the sub-carrier mapper 516 to indicate the narrow band spectrum occupied by the Bluetooth data for any given hop through the ISM band. In this way, the sub-carrier mapper 516 can avoid using the tones within that narrow band spectrum for carrying the OFDM data.

The processing system 504 also includes an adder 520 for combining the outputs from the FFT 510 and the sub-carrier mapper 516 to produce a combined signal as shown by waveform 522. The combined signal 522 generated by the adder 520 is provided to a DFT 305. The DFT 305 in combination with a sub-carrier mapper 307 tends to reduce the peak-to-average ratio of the signal at the output of the transmitter 104 by performing a DFT on the combined signal 522 and then re-modulating the data onto different tones of the OFDM signal. The output from the sub-carrier mapper 307 is provided to an inverse fast Fourier transform (IFFT) 308, which provides a time-domain representation of the signal from the sub-carrier mapper 307. A wireless interface 310 converts the time domain signal from the IFFT 308 to an analog signal, which is used to modulate a carrier frequency for transmission through an antenna 312.

A combined RF signal comprising the signal from the OFDM transmitter 104 and the signal from the Bluetooth transmitter 106, as shown by waveform 530, is provided to a wireless interface 318. The wireless interface 318 recovers the combined RF analog signal from the carrier and provides various processing (e.g., filtering, amplification, frequency down-conversion, and analog-to-digital conversion) to obtain time-domain samples. The time-domain samples are then provided to a processing system 319.

The processing system 319 converts the time-domain samples back to the frequency domain using a FFT 320. A sub-carrier demapper 351 in combination with an IDFT 352 performs the inverse operation of the DFT 305 and sub-carrier demapper 307 in the transmitter 104 to recover the original combined signal (i.e., waveform 522). The narrow band portion of the ISM band carrying the Bluetooth data can be provided to an IFFT 324 in the processing system 319. The IFFT 324 may be used to recover the data from the Bluetooth signal source 506 in the transmitter 502 as shown in the frequency domain by waveform 534. Since the tones carrying the OFDM data do not overlap with the narrow band spectrum carrying the Bluetooth data, there should be no loss in OFDM data due to interference from the Bluetooth signal as shown in the frequency domain by waveform 536.

The various configurations of transmitters and receivers described throughout this disclosure include a processing system. The processing system for any configuration of a transmitter or receiver may be implemented or performed with a general purpose processor, a microcontroller, a digital signal processor (DSP), an application specific integrated circuit (ASIC), a field programmable gate array (FPGA), a programmable logic device, a controller, a state machine, discrete hardware components, or any combination thereof, or other suitable entity that can perform the various functions described throughout this disclosure. The processing system 504 may also include one or more machine-readable medium for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media includes any medium that facilitates transfer of software from one place to another. By way of example, machine-readable media may include RAM, ROM, EEPROM, CD-ROM or other optical disk storage, magnetic disk storage or other magnetic storage devices, or any other medium that can be used to carry or store software in the form of instructions or data structures and that can be accessed by the processing system. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of machine-readable media.

Figure 6:
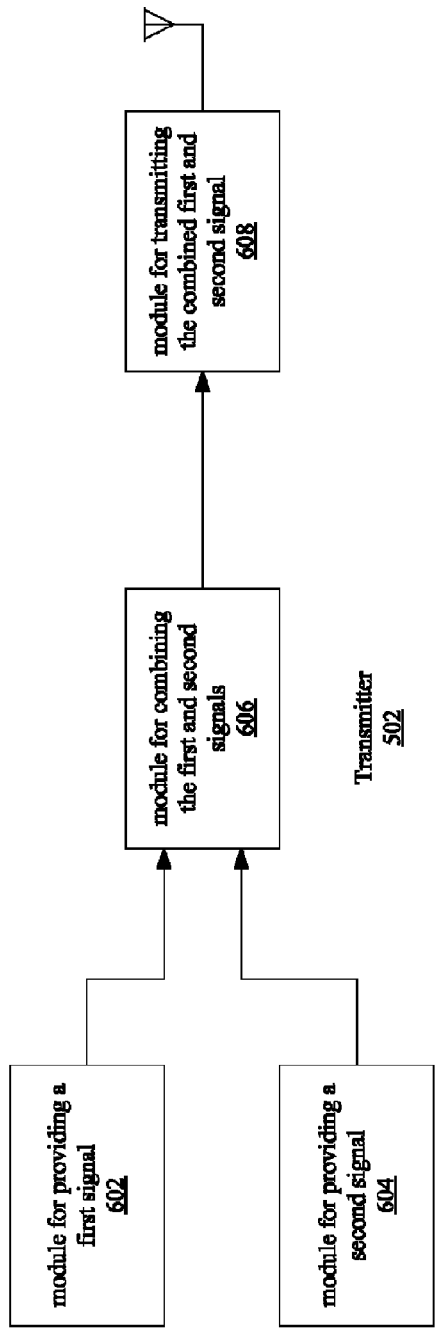
FIG. 6 is a conceptual block diagram illustrating an example of the functionality of a transmitter.

FIG. 6 is a conceptual block diagram illustrating an example of the functionality of a transmitter 502. The transmitter 502 includes a module 602 for providing a first signal having data in a first frequency band, and a module 604 for providing a second signal having a second frequency band, the first frequency band being within a sub-band of the second frequency band. The module 604 is further configured to provide a second signal having data in the second frequency band with no data in the sub-band of the second frequency band. The transmitter 502 also includes a module 606 for combining the first and second signals. The modules 602, 604, and 606 may be implemented by the processing system 504 described above, or by some other means. The transmitter 502 also includes a module 608 for transmitting the combined first and second signal, which may be implemented by the wireless interface 526 described above, or by some other means.

Figure 7:
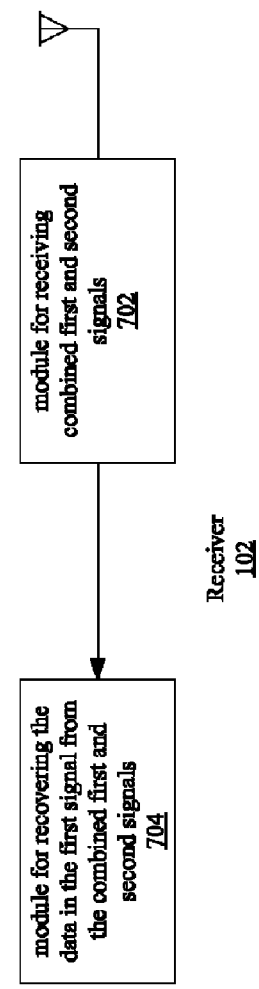
FIG. 7 is a conceptual block diagram illustrating an example of the functionality of a receiver.

FIG. 7 is a conceptual block diagram illustrating an example of the functionality of a receiver 102. The receiver 102 includes a module 702 for receiving combined first and second signals, the first signal having data in a first frequency band and the second signal having data in a second frequency band wider than the first frequency band, wherein the first frequency band is within the second frequency band. The module 702 may be implemented with the wireless interface 318 described above, or by some other means. The receiver 102 also includes a module 704 for recovering the data in the first signal from the combined first and second signals, which may be implemented by the processing system 319 described above, or by some other means.

As explained in greater detail earlier, the wireless interface in the transmitter 502 modulates a carrier with data and the wireless interface in the receiver 102 demodulates the carrier to recover data. The wireless interface in the transmitter and/or receiver may also provide various other functions, such as RF front-end processing and other analog physical layer functions. In at least one configuration of a wireless interface, the RF front-end processing of the OFDM and Bluetooth signals is performed by common circuitry. The wireless interface may have a bandpass equal to the bandwidth of the OFDM signal, thereby filtering the remainder of ISM band before being provided to the processing. Alternatively, the wireless interface may have a bandpass equal to the bandwidth of the ISM signal, with the processing system performing the filtering function for the portion of the ISM band outside the OFDM signal bandwidth. A programmable adjustable interface (not shown) may be used to adjust one or more parameters of the wireless device such as, by way of example, gain, bandpass, etc. The adjustment may be useful for a number of applications including when only the OFDM or Bluetooth signal is present.

In the numerous configurations of a processing system described thus far, various Fourier transform functions have been used. By way of example, at the transmitter, a DFT in combination with a sub-carrier mapper is used to reduce the average peak-to average ratio of the signal, and an IFFT is used to convert from the frequency to the time-domain. At the receiver, a FFT is used to convert from the time to frequency-domain, and a sub-carrier demapper in combination with a IDFT is used to recover the data by performing the inverse function of the DFT and sub-carrier mapper at the transmitter. However, as those skilled in the art will readily appreciate, a DFT may be used in place of a FFT, and a FFT may be used in place of a DFT. Similarly, an IDFT may be used in place of an IFFT, and an IFFT may be used in place of an IDFT.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
a wireless interface configured to receive combined first and second signals, the first signal having data in a first frequency band and the second signal having data in a second frequency band wider than the first frequency band, wherein at least a portion of the first frequency band is within the second frequency band for a period of time, wherein the data in the second signal is encoded with an error correction code, and wherein the wireless interface performs amplification, down-conversion, filtering, and analog-to-digital conversion to obtain time-domain samples; and
a processing circuit configured to receive the time-domain samples and to convert the time-domain samples into a frequency domain signal, to decode the frequency domain signal thereby obtaining a decoded frequency domain signal, and to subtract the decoded frequency domain signal from the frequency domain signal thereby recovering the data in the first signal, wherein the processing circuit is configured to recover from the frequency domain signal both the data of the first signal and the data of the second signal during the period of time.

2. The receiver of claim 1 wherein the first signal is moving in the frequency domain.

3. The receiver of claim 1 wherein a portion of the first frequency band is outside the second frequency band for the period of time.

4. The receiver of claim 1 wherein the wireless interface is further configured to process both the first and second signals with common circuitry.

5. The receiver of claim 1 wherein the wireless interface comprises a bandpass corresponding to the first and second frequency band combined.

6. The receiver of claim 1 wherein the second frequency band is within a wider frequency band allocated to transmissions of the second signal, and wherein the wireless interface comprises a bandpass corresponding to the wider frequency band.

7. The receiver of claim 1 wherein the processing circuit performs fast Fourier transform (FFT) processing, sub-carrier demapping, and inverse Fourier transform (IDFT) to convert the time-domain samples into the frequency domain signal.

8. The receiver of claim 1 wherein the processing circuit performs inverse fast Fourier transform (IFFT) processing to convert the difference between the decoded frequency domain signal and the frequency domain signal into the data of the first signal.

9. The receiver of claim 1 wherein the second signal comprises an Orthogonal Frequency Division Multiplexing (OFDM) signal.

10. The receiver of claim 1, wherein the first signal is a Bluetooth signal and the second signal is an Orthogonal Frequency Division Multiplexing (OFDM) signal, wherein the first data in the first frequency band is Bluetooth data, and wherein the second data in the second frequency band is OFDM data.

11. The receiver of claim 1, wherein the combined first and second signals form a combined Radio Frequency (RF) analog signal, and wherein the wireless interface recovers the combined RF analog signal from a carrier.

12. A method of communications, comprising:
receiving combined first and second signals, the first signal having data in a first frequency band and the second signal having data in a second frequency band wider than the first frequency band, wherein at least a portion of the first frequency band is within the second frequency band for a period of time, wherein the second signal is encoded with an error correction code, and wherein the receiving also involves performing amplification, down-conversion, filtering, and analog-to-digital conversion to obtain time-domain samples; and
recovering from a frequency domain signal both the data of the first signal and the data of the second signal during the period of time by:
converting the time-domain samples into the frequency domain signal;
decoding the frequency domain signal thereby generating a decoded frequency domain signal and thereby also recovering the data of the second signal;
subtracting the decoded frequency domain signal from the frequency domain signal to obtain a subtractor output signal; and
performing inverse fast Fourier transform (IFFT) processing on the subtractor output signal to recover the data of the first signal.

13. The method of claim 12 wherein the first signal is moving in the frequency domain.

14. The method of claim 12 wherein a portion of the first frequency band is outside the second frequency band for the period of time.

15. The method of claim 12 wherein the receiving of the combined first and second signals comprises processing both the first and second signals with common circuitry.

16. The method of claim 12 wherein the receiving of the combined first and second signals is performed with a wireless interface having a bandpass corresponding to the first and second frequency band combined.

17. The method of claim 12 wherein the second frequency band is within a wider frequency band allocated to transmissions of the second signal, and wherein the receiving of the combined first and second signals is performed with a wireless interface having a bandpass corresponding to the wider frequency band, and wherein the wireless interface performs the amplification, the down-conversion, the filtering, and the analog-to-digital conversion to obtain the time domain-samples.

18. A non-transitory machine-readable medium comprising instructions executable by a processing system in a receiver, the receiver having a wireless interface configured to receive combined first and second signals, the first signal having first data in a first frequency band and the second signal having second data in a second frequency band wider than the first frequency band, wherein at least a portion of the first frequency band is within the second frequency band for a period of time, wherein the second signal is encoded with an error correction code, and wherein the wireless interface performs amplification, down-conversion, filtering, and analog-to-digital conversion to obtain time-domain samples, the instructions comprising code to:

control the receiver to: a) convert the time-domain samples into a frequency domain signal, b) decode the frequency domain signal to obtain a decoded frequency domain signal comprising the second data, c) subtract the decoded frequency domain signal from the frequency domain signal to obtain a subtractor output signal, and d) perform inverse fast Fourier transform (IFFT) processing on the subtractor output signal to obtain the first data, wherein the first data and the second data are both recovered from the frequency domain signal during the period of time.

19. A method comprising:
(a) receiving a combined Radio Frequency (RF) signal on an antenna, wherein the combined RF signal comprises a Bluetooth signal and an Orthogonal Frequency Division Multiplexing (OFDM) Wireless Local Area Network (WLAN) signal, wherein the OFDM WLAN signal is encoded with an error correction code, wherein the Bluetooth signal includes Bluetooth data, and wherein the OFDM WLAN signal includes WLAN data;
(b) using a wireless interface to amplify the combined RF signal, to down-convert the combined RF signal, to perform filtering, and to perform analog-to-digital conversion thereby obtaining time domain samples;
(c) using a processing system to convert the time-domain-samples into a frequency domain signal;
(d) using the processing system to decode the frequency domain signal to obtain a decoded frequency domain signal and thereby recovering the WLAN data;
(e) using the processing system to subtract the decoded frequency domain signal from the frequency domain signal to obtain a subtractor output signal; and
(f) using the processing system to perform inverse fast Fourier transform (IFFT) processing on the subtractor output signal and thereby recovering the Bluetooth data, wherein the antenna, the wireless interface and the processing system are parts of a receiver.

20. The method of claim 19, wherein the Bluetooth data is recovered in (f) without use of a separate Bluetooth receiver.

21. The method of claim 20, wherein the wireless interface performs RF front-end processing of the OFDM WLAN signal and of the Bluetooth signal, and wherein this the RF front-end processing is performed by common circuitry.

22. A receiver, comprising:
a single antenna;
a single wireless interface that receives a combined first and second signal from the single antenna, wherein the first signal has first data in a first frequency band, wherein the second signal has second data in a second frequency band wider than the first frequency band, wherein at least a portion of the first frequency band is within the second frequency band for a period of time, wherein the second signal is encoded with an error correction code, and wherein the single wireless interface amplifies the combined first and second signal to generate an amplified combined first and second signal, down-converts the amplified combined first and second signal to generate a down-converted combined first and second signal, and filters the down-converted combined first and second signal to generate filtered combined first and second signal, and analog-to-digital converts the filtered combined first and second signal to generate time-domain samples; and
a single processing system that receives the time-domain samples and performs fast Fourier transform (FFT) processing and sub-carrier demapper processing and inverse discrete Fourier transform (IDFT) processing thereby generating a single frequency domain signal, wherein the single processing system then recovers from the single frequency domain signal both the first data and the second data, wherein the single processing system comprises:
    an FEC (forward error correction) decoder that decodes the single frequency domain signal and outputs a decoded frequency domain signal, wherein the decoded frequency domain signal comprises the second data;
    a subtractor that receives the decoded frequency domain signal and the frequency domain signal and outputs a subtractor output signal; and
    an inverse fast Fourier transform (IFFT) functionality that receives the subtractor output signal and outputs the first data.

\* \* \* \* \*